C. Stearns,
Drain Tile,
№ 1,147.                    Patented May 8, 1839.
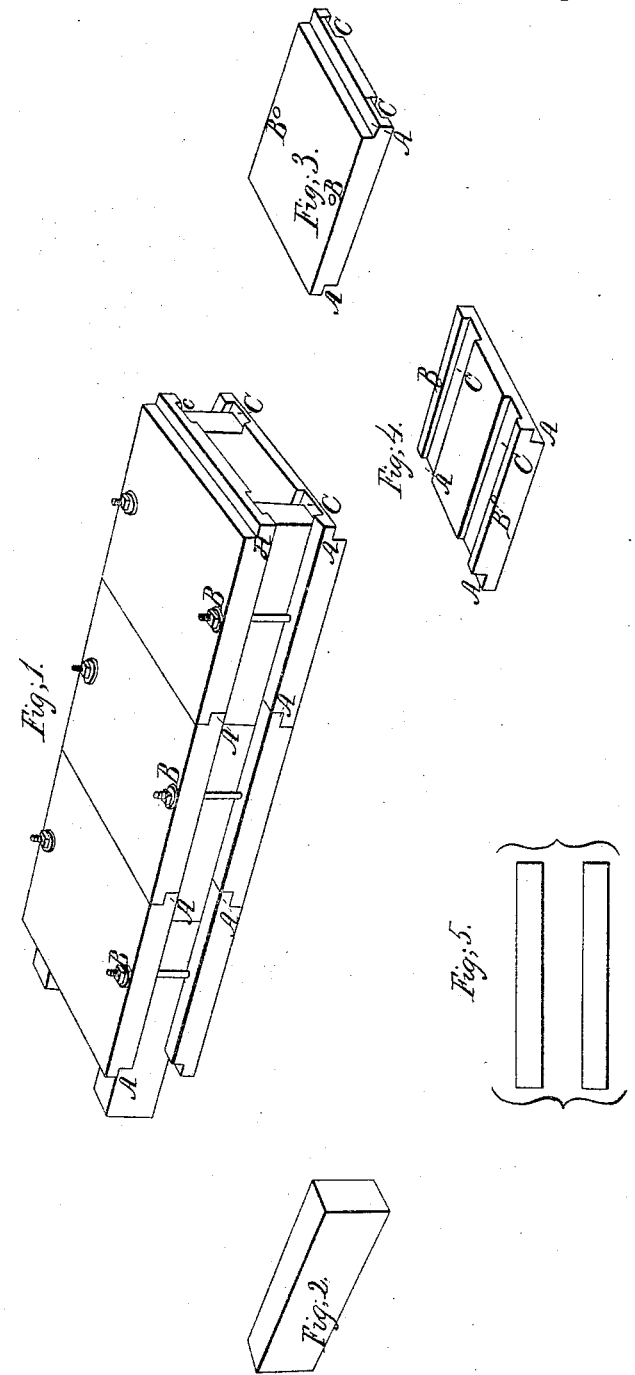

UNITED STATES PATENT OFFICE.

CHARLES STEARNS, OF SPRINGFIELD, MASSACHUSETTS.

CONSTRUCTION OF EARTHEN OR CEMENT PIPES FOR CONVEYING WATER, &c.

Specification of Letters Patent No. 1,147, dated May 8, 1839.

*To all whom it may concern:*

Be it known that I, CHARLES STEARNS, of Springfield, Hampden county, State of Massachusetts, have invented a new and useful Improvement in the Mode of Constructing Tubes of Burnt Clay and Hydraulic Cement for Conveying Water, Heated Air, Gas, &c., which is described as follows, reference being had to the annexed drawings of the same, making part of this specification.

This mode of constructing tubes for conveying water, air, gas, &c., from one place to another consists in molding a number of rectangular pieces of clay, with notches, or halved, at each end, on opposite sides and channeled on one side with two parallel channels and perforated on each side with a round aperture for a screw bolt, as represented in the drawings, and then burning them in a kiln. These pieces are to form the top and bottom of the pipe. The pieces for the sides may be cast or molded in a similar manner excepting the apertures, which may be omitted and burnt as before described. One of the side pieces may be made of a plain rectangular figure, also the top and bottom may be made plain.

In putting the before described pieces together so as to form a tube or conduit, a set of those which are notched or halved at each end are placed in the bottom of the trench, their ends covered with hydraulic cement and brought close together so as to make tight joints, the channeled sides being up. Then the surfaces of the channels are covered with cement and the side pieces placed in the channels, edge up, their ends covered with cement and brought close together. Then the upper edges of these side pieces are covered with cement and the pieces designed for the top placed upon them, the edges in the channels and the halved ends also covered with cement, lapped and the joints all made perfectly tight. Screw bolts are then inserted through the apertures in the sides of the top and bottom and the latter drawn tight together by means of screw taps placed on said bolts or by means of keys inserted through apertures made in the bolts to receive them. The screw bolts may be omitted when the pressure on the inside is not very great.

Figure 1, in the annexed drawings, represents a perspective view of the parts put together forming the aqueduct, Fig. 2 one of the side pieces detached, Fig. 3 one of the notched top pieces, Fig. 4 one of the notched bottom pieces, Fig. 5 one of the top and bottom pieces made plain.

A the notches of the ends, B the apertures for the screw bolts, C the channels.

When plain pieces are used for the top, bottom, and sides, the joints must all be broken and made tight with cement.

The invention claimed and desired to be secured by Letters Patent consists in—

The before described mode of making pipes on conduits for conveying water, &c.—that is to say with rectangular pieces of burnt clay channeled on each side of their inner surface to receive the pieces forming the sides of the tube and also the method of fastening them together with bolts, all substantially as above described.

CHARLES STEARNS.

Attest:
JUSTIN WILLARD,
JOS. D. NEWCOMB.